United States Patent
Kim et al.

(10) Patent No.: US 11,043,814 B2
(45) Date of Patent: Jun. 22, 2021

(54) APPARATUS FOR CONTROLLING ESS ACCORDING TO TRANSIENT STABILITY STATE AND METHOD THEREOF

(71) Applicant: KOREA ELECTRIC POWER CORPORATION, Naju-si (KR)

(72) Inventors: Tae-Ok Kim, Seoul (KR); Jong-An Kim, Gwangju (KR); Gu-Han Kim, Seoul (KR); Chong-Ho Rhim, Naju-si (KR); Yong-Gu Ha, Naju-si (KR)

(73) Assignee: KOREA ELECTRIC POWER CORPORATION, Naju-si (KR)

( * ) Notice: Subject to any disclaimer, the term of this patent is extended or adjusted under 35 U.S.C. 154(b) by 0 days.

(21) Appl. No.: 16/490,887

(22) PCT Filed: Aug. 2, 2017

(86) PCT No.: PCT/KR2017/008357
§ 371 (c)(1),
(2) Date: Sep. 3, 2019

(87) PCT Pub. No.: WO2018/199395
PCT Pub. Date: Nov. 1, 2018

(65) Prior Publication Data
US 2020/0185920 A1    Jun. 11, 2020

(30) Foreign Application Priority Data
Apr. 27, 2017   (KR) .................. 10-2017-0054240

(51) Int. Cl.
*H02J 3/32*       (2006.01)
*H02J 7/02*       (2016.01)

(52) U.S. Cl.
CPC . *H02J 3/32* (2013.01); *H02J 7/02* (2013.01)

(58) Field of Classification Search
CPC ...................................... H02J 3/32; H02J 7/02
See application file for complete search history.

(56) References Cited

U.S. PATENT DOCUMENTS

| 8,060,259 B2* | 11/2011 | Budhraja ............... H02J 3/008 700/291 |
| 2013/0214537 A1* | 8/2013 | Hashimoto ............. F03D 9/255 290/55 |

(Continued)

FOREIGN PATENT DOCUMENTS

| JP | 2007-288835 A | 11/2007 |
| JP | 2012-010453 A | 1/2012 |

(Continued)

OTHER PUBLICATIONS

Kyu-Ho Kim, Application of Newton's Approach for Transient Stability Improvement by Using Generation Rescheduling, Journal of KIEE, Jan. 2013, pp. 68-75, vol. 27, No. 1.

*Primary Examiner* — Jared Fureman
*Assistant Examiner* — Esayas G Yeshaw
(74) *Attorney, Agent, or Firm* — Foundation Law Group, LLP

(57) ABSTRACT

The present invention relates to an ESS control device based on transient stability state and a method thereof, the an ESS control device based on transient stability state according to an embodiment of the present invention including an input unit receiving phase angle information from a power system; a calculation unit calculating a change rate in the phase angle of the power system using the phase angle information; a determination unit determining the transient stability state of the power system by comparing the change rate of the phase angle with a predetermined threshold; and a control unit performing control so that an energy storage system (ESS) installed in a power generation stage is switched to a charging mode according to the determination result.

11 Claims, 4 Drawing Sheets

(56) References Cited

U.S. PATENT DOCUMENTS

2014/0285156 A1\* 9/2014 Mukaitani ............ G01R 31/392
320/134
2016/0334447 A1\* 11/2016 Parashar ................ G01R 31/40
2017/0074179 A1\* 3/2017 Mikawa .............. F02D 41/0002
2017/0237256 A1\* 8/2017 Majumder ................ H02J 3/06
307/80

FOREIGN PATENT DOCUMENTS

| KR | 10-2009-0064796 A | 6/2009 |
| KR | 10-1467249 B1 | 12/2014 |
| KR | 10-2016-0059551 A | 5/2016 |
| KR | 10-2016-0108755 A | 9/2016 |

\* cited by examiner

APPARATUS FOR CONTROLLING ESS ACCORDING TO TRANSIENT STABILITY STATE AND METHOD THEREOF

CROSS-REFERENCE TO RELATED APPLICATION(S)

This application claims the benefit under 35 U.S.C. Section 371, of PCT International Application No. PCT/KR2017/008357, filed on Aug. 2, 2017, which claimed priority to Korean Patent Application No. KR 10-2017-0054240, filed on Apr. 27, 2017, the disclosures of which are hereby incorporated by the references.

TECHNICAL FIELD

The present invention relates to an ESS control device based on transient stability state and a method thereof and, more specifically, to an ESS control device based on transient stability state and a method thereof, which enables determining a transient stability state of the power system and determining an output value in a charging mode of an energy storage system (ESS) to control an output of the ESS, thereby improving the transient stability in consideration of disturbance of the power system.

BACKGROUND ART

A power system refers to a system that connects power generation, substations and loads to transmission lines in response to electricity demand, from generation of power to consumption. The power system has to allow balancing of power supply and demand because power is generated and consumed at the same time. Therefore, the power system needs to constantly monitor the balance of supply and demand.

The power system is easy to monitor in the case of a small scale. However, since power facilities have become large-scaled and complicated as power demand has gradually increased due to advancement and informatization in the industry, there is a limitation in that it is difficult to perform effective operation through the methods that have been artificially performed so far.

Recently, by using a technology for collecting, processing, analyzing, and controlling information obtained from a real-time precision power equipment data acquisition equipment such as a phasor measurement unit (hereinafter referred to as PMU), or a new technology facility (for example, ESS, FACTS, HVDC, etc.), integrated power facility operation and automation is rapidly promoted for efficient performance of power system operation.

In particular, an energy storage system (hereinafter, referred to as "ESS") is a technology required for the commercialization of large-size lithium-ion batteries, as research on the large capacity and long-life of lithium-ion batteries has been conducted, focusing on transportation energy fields such as hybrid electric vehicle (HEV) and electric vehicle (EV).

The large lithium-ion battery has a market potential that can be spread in the innumerable fields, including, for example, the automotive field, the agriculture and construction machinery field, the industrial machinery field, the moving body field of a two-wheeler and a trolley, and the natural energy field.

In the field of large power storage, a large-size battery, such as an NAS battery, redox flow battery, etc. are in the early stage of commercialization, and a new market is expected with high-quality power systems, in competition with self-generating facilities. Such large-size batteries are inferior in performance to lithium-ion batteries, but particularly have a good price-to-capacity and thus are used for large-capacity power storage.

In Korea, the demand for electricity continues to increase due to the expansion of the economic scale and the improvement of living standards. The load is concentrated in the metropolitan area and power plants are being constructed as a super large-scale power generation complexes.

However, when the constructions of the lead-out line of the super large-scale power generation complex and the extra-high voltage transmission network are delayed, because a power generation constraint of the power plant is applied as a general countermeasure for securing the stability of the power grid, there is a need for a plan to minimize the power generation constraint for economic system operation.

Specifically, the power generation facilities are being expanded by the continuous increase in power demand, but it is difficult to construct the power transmission lines which transport power generation due to environmental factors and civil complaints.

Herein, in order to secure the reliability of the power system by lowering the transient stability of the power plant, it is possible to take generator protection measures by a special protection system (SPS) or power generation constraints. Such measures can cause large-scale failures, such as wide-area power outages, because economic constraints make it difficult to reduce the economics of the power system operation due to the power generation constraints, or shutting down of large-capacity generators in the event of failure may lead to excessive frequency drop.

In recent years, commercialization is actively underway to put into the domestic power grid for ESS, and for this purpose, a system for expansion activation is being prepared. When such a power storage system has high-speed response characteristics, a method of improving the transient stability is considered.

Accordingly, there is a need for an ESS control method which is used for improving the transient stability that can minimize the serious power constraints expected in the domestic power system by improving the system stability using the ESS.

Therefore, when there is provided a control plan of the ESS that can improve the transient stability through a large number of large-capacity ESS propagated in a large scale manner, it will be able to improve the reliability of the power system and reduce the cost of power generation constraints.

DISCLOSURE

Technical Problem

An objective of the present invention to provide an ESS control device based on transient stability state and a method thereof, which enables determining the transient stability state of the power system and determining an output value in a charging mode of an ESS to control an output of the ESS, thereby improving the transient stability in consideration of disturbance of the power system.

Technical Solution

An ESS control device based on a transient stability state according to an embodiment of the present invention includes: an input unit receiving phase angle information from a power system; a calculation unit calculating a change rate of the phase angle of the power system using the phase angle information; a determination unit determining the transient stability state of the power system by comparing the change rate of the phase angle with a predetermined threshold; and a control unit performing control so that an energy storage system (ESS) installed in a power generation stage is switched to a charging mode according to the determination result.

The input unit may receive frequency information instead of the phase angle information.

The change rate of the phase angle may be a change degree of a speed difference in phases of the power system over time.

The determination unit may determine the transient stability state as transient instability when the change rate of the phase angle is greater than or equal to the predetermined threshold.

The control unit may calculate an output value in the charging mode for switching control of the ESS into the charging mode and determine the output value of each ESS in the charging mode, to control an output of the ESS with the output value of each ESS in the charging mode.

The controller may be responsive to the output value in the charging mode within a predetermined time at the time of transient.

An ESS control method based on a transient stability state according to an embodiment of the present invention includes: receiving phase angle information from a power system; calculating a change rate of the phase angle of the power system using the phase angle information; determining a transient stability state of the power system by comparing the change rate of the phase angle with a predetermined threshold; and performing control so that an energy storage system (ESS) installed in a power generation stage is switched to a charging mode according to the determination result.

The determining may be provided so that when the change rat of the phase angle is equal to or more than the predetermined threshold, the transient stability is determined as a transient instability state.

The determining may be provided so that when the phase angle change rate is less than the predetermined threshold, the transient stability is determined as a transient stable state and thus the control is terminated.

The controlling may be provided to calculate a output value in the charging mode for switching control of the ESS into the charging mode and determine the output value of each ESS in the charging mode, to control an output of the ESS with the output value of each ESS in the charging mode.

Advantageous Effects

According to the present invention, it is possible to determine the transient stability state of the power system and determine an output value in a charging mode of an ESS to control an output of the ESS, thereby improving the transient stability in consideration of the disturbance of the power system.

In addition, according to the present invention, in order to solve the transient instability, it is possible to perform control so that the ESS installed in the power plant is switched to the charging mode instantaneously in the case of disturbance to slow down the rotational speed of a rotor accelerated due to the failure, thereby improving the transient stability.

In addition, the present invention enables stable and economical power system operation by improving the transient stability.

In addition, according to the present invention, it is possible to perform economic power supply by reducing the power generation constraints and minimizing the generation power interruption by the special protection system (SPS).

MODE FOR INVENTION

Figure 1:
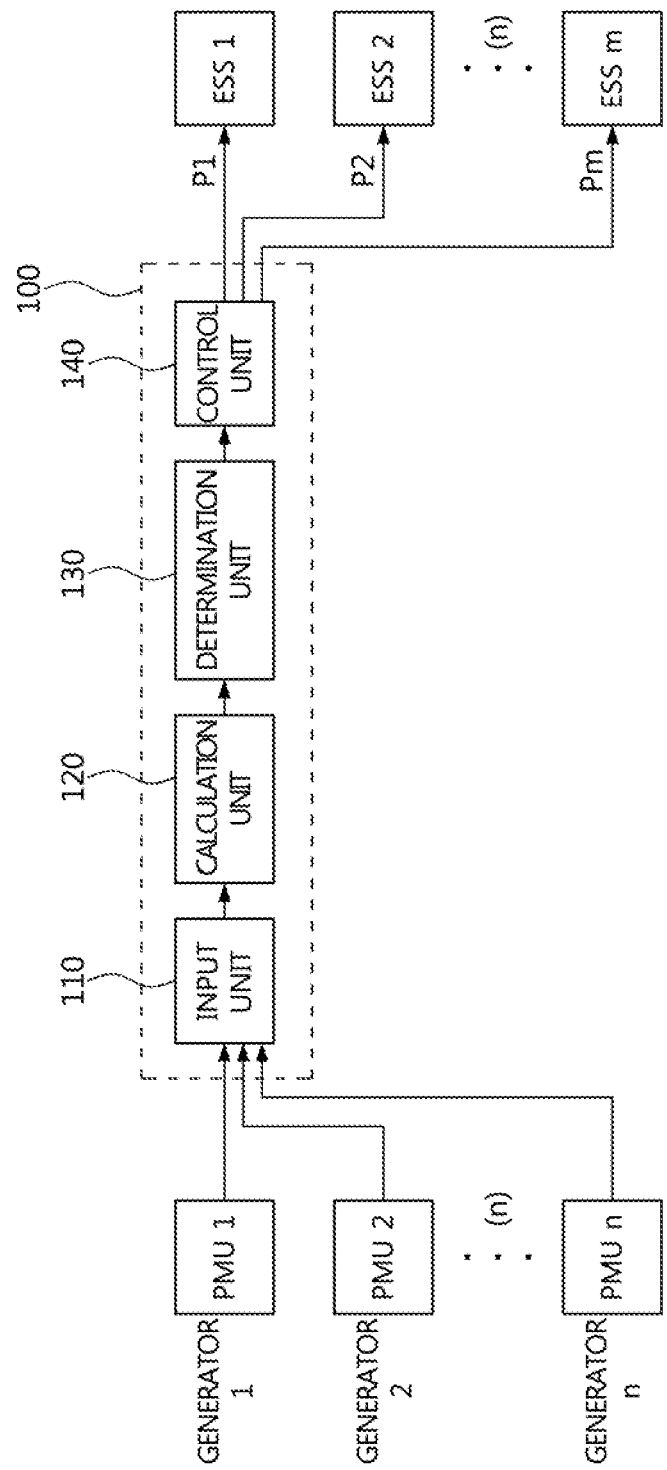
FIG. 1 is a view illustrating an ESS control device based on the transient stability state according to an embodiment of the present invention.

For a better understanding of the present invention, a preferred embodiment of the present invention will be described with reference to the accompanying drawings. The embodiments of the present invention can be modified in various forms, and the scope of the present invention should not be construed as being limited to the embodiments described in detail below. The present embodiments are provided to enable those skilled in the art to more fully understand the present invention. Therefore, the shapes and the like of the elements in the drawings can be exaggeratedly expressed to emphasize a clearer description. It should be noted that the same components are denoted by the same reference numerals in the drawings. Detailed descriptions of well-known functions and constructions which may be unnecessarily obscured by the gist of the present invention are omitted.

In addition, the term "unit" as used herein refers to a hardware component, such as software, FPGA or ASIC, and "unit" plays certain roles. However, "unit" is not meant to be limited to software or hardware. The "unit" may be configured to be in an addressable storage medium and may be configured to play one or more processors. Thus, as an example, a "unit" refers to components such as software components, object-oriented software components, class components, and task components, processes, functions, properties, procedures, subroutines, segments of program code, drivers, firmware, microcode, circuits, data, databases, data structures, tables, arrays and variables. The functionality provided within the components and the "units" may be combined into a smaller number of components and "units" or further separated into additional components and "units". (Preliminary correction will be added)

FIG. 1 is a view illustrating an ESS control device based on the transient stability state according to an embodiment of the present invention.

As shown in FIG. 1, an ESS control device based on the transient stability state (hereinafter, referred to as "ESS control device") 100 according to an embodiment of the present invention controls an ESS to improve the transient stability in consideration of disturbances of the power system.

In general, when the power system is operated in a steady state, components such as generators, lines, and loads are electrically balanced with each other, but when disturbances such as power loss, track failure, load fluctuations, etc. occur, the system may fluctuate. Such fluctuation may soon be recovered depending on the degree of disturbance or the state of the system, making it possible to remain in a new normal state, or may be worsened, disrupting the power system as the connections between the components are broken continuously. That is, disturbances of the power system may lead to an instable state in transient stability of the power system, which may cause a loss of synchronism due to an increase in a phase angle difference between generators and cause large-scale power outages such as failure propagation and blackout.

Here, a term "transient stability" refers to the ability of the power system to maintain a stable transmission against disturbances of the power system.

The transient stability is related to the phase angle (or phase angle difference, phase difference angle) stability associated with maintaining the synchronization between generators. The phase angle stability is the stability associated with maintaining equivalent operation between generators and is related to the speed of an inertial rotor of the generator, which is changed due to a difference between an input and an output of a generator rotor.

The ESS control device 100 performs control so that the ESS installed in the power plant is switched to the charging mode instantaneously when disturbance occurs in the vicinity of the power plant in order to solve the instable state in the transient stability. As such, the ESS control device 100 reduces the rotational speed of the generator rotor accelerated by the failure through the charging mode control, thereby improving the transient stability.

As such, the ESS control device 100 may provide a stable and economical power system operating environment by improving the transient stability through this process, and provide an economical power supply environment by reducing power generation constraints and minimizing generation power interruption by a special protection system (SPS).

Meanwhile, the ESS control device 100 includes an input unit 110, a calculation unit 120, a determination unit 130, and a control unit 140. In addition, each of multiple generators 1 to n has PMU 1 to PMU n, respectively. The multiple generators 1 to n are connected to the input unit 110, and multiple ESSs 1 to m are connected to the control unit 140. As a specific example of the power system, the case where the ESS is controlled by determining the transient stability of the generators 1 to n will be described.

The input unit 110 receives phase angle information 61 to 6n of each generator from the PMUs 1 to n provided in the multiple generators 1 to n, respectively. Here, the input unit 110 may receive input frequency information of each generator, instead of the phase angle information of each generator.

The calculation unit 120 calculates a change rate of phase angle between generators using the phase angle information of each generator, which is collected through the input unit 110. Specifically, the change rate of phase angle $$\frac{\Delta \delta}{\Delta t}$$

between generators is shown in Equation 1 below. The change rate of phase angle represents the change degree of a speed difference in phases of the generators (i.e., the speed difference between a phase of the fastest generator and a phase of the slowest generator) over time.

$$\frac{\Delta \delta}{\Delta t} = \frac{(\delta_a - \delta_b) - (\delta'_a - \delta'_b)}{t - t'} \quad \text{[Equation 1]}$$

Where, $\delta_a$ is a phase of the generator having the fastest phase at time t, and $\delta_b$ is a phase of the generator having the slowest generator at time t. $\delta'_a$ is a phase of the generator having the fastest phase at time t', and $\delta'_b$ is the phase of the generator having the slowest phase at time t'.

The determination unit 130 determines the state of the transient stability by using the change rate of the phase angle between the generators calculated by the calculation unit 120.

Specifically, the determination unit 130 determines the state of transient stability by comparing the change rate of phase angle between the generators with a predetermined threshold value. That is, the determination unit 130 determines the state of transient stability as "transient instability", when the change rate of the phase angle between the generators is equal to or greater than the predetermined threshold value (that is, $\Delta \delta / \Delta t \geq$ threshold). On the other hand, the determination unit 130 determines the state of the transient stability state as "transient stability", when the change rate of the phase angle between the generators is less than the preset threshold (that is, $\Delta \delta / \Delta t <$ threshold).

Here, the threshold is an index indicating the stable or unstable state of transient stability. When the threshold is set large, the ESSs 1 to m become larger in the non-operating region that does not operate in the charging mode. When the degree of acceleration of the generator is small, normalization may be obtained by the inertia of the governor or the power system so that it is preferable that the size of the threshold is set according to the characteristics of the power system. For example, when a large disturbance occurs in the power system, the generator near the failure point instantaneously has the rotational angular speed changed to 50 (°/sec) or more. Herein, when the threshold value is set to 50 (°/sec) or less, the ESSs 1 to m are switched to a charging mode without a sub-operation in the unstable state of transient stability and thus operated to improve the transient stability.

The control unit 140 controls multiple ESSs 1 to m according to the determination result of the determination unit 130.

In other words, when the transient stability of the power system is confirmed as transient instability state, the control unit 140 performs control so that the ESSs 1 to m installed in the power generation stage are switched to the charging mode.

Herein, the control unit 140 first calculates an output value P of the ESS in a charging mode, according to Equation 2 below.

$$P = K_1 \cdot \frac{\Delta \delta}{\Delta t} + K_2 \cdot \frac{\Delta \delta}{\Delta t} + \ldots + K_m \cdot \frac{\Delta \delta}{\Delta t} = P_1 + P_2 + \ldots + P_m \quad \text{[Equation 2]}$$

Where, K1, K2, . . . , Km is a gain set according to the rated output capacity of each ESS, and the output value of each ESS in the charging mode does not exceed the rated output capacity of each ESS.

In addition, the control unit 140 determines the output values P1, P2, . . . , Pm of each ESS in the charging mode, and the output of the corresponding ESS is controlled as the calculated output value (P1, P2, . . . , Pm) of each ESS in the charging mode.

The control unit 140 is responsive to the output value in the charging mode within one second at the time of the transient, and then the output may be changed to zero or used for frequency adjustment control.

The ESS switched to the charging mode may reduce the rotational speed of the generator rotor accelerated due to disturbance, thereby improving the transient stability.

Specifically, the rotational acceleration of the generator may be represented by an equation of motion of a rotating body. The equation of motion of the rotating body is shown in Equation 3 below.

$$\frac{d\omega}{dt} = \frac{\omega_0}{M}(P_m - P_e) \qquad \text{[Equation 3]}$$

Where, $$\frac{d\omega}{dt}$$

is an angular acceleration, $\omega_0$ is a synchronous angular speed of the rotating body, M is an inertia constant, $P_m$ is a mechanical input, and $P_e$ is an electrical output. Herein, referring to Equation 3, it may be appreciated that when the mechanical input $P_m$ is greater than the electrical output $P_e$, the rotating body is accelerated, and when the mechanical input $P_m$ is smaller than the electrical output $P_e$, the rotating body is decelerated.

Therefore, when the ESS near the generator being accelerated is switched to the charging mode and thus output is performed, the ESS acts as a load so that the electrical output value increases and the energy for decelerating the rotating body increases, whereby the rotating body accelerated due to the disturbance is reduced in speed. Through this process, the generator maintains synchronization, thereby improving the transient stability.

Meanwhile, the control unit 140 terminates control without performing the control of the ESSs 1 to m when the transient stability of the power system is confirmed as transient stable state.

Figure 2:
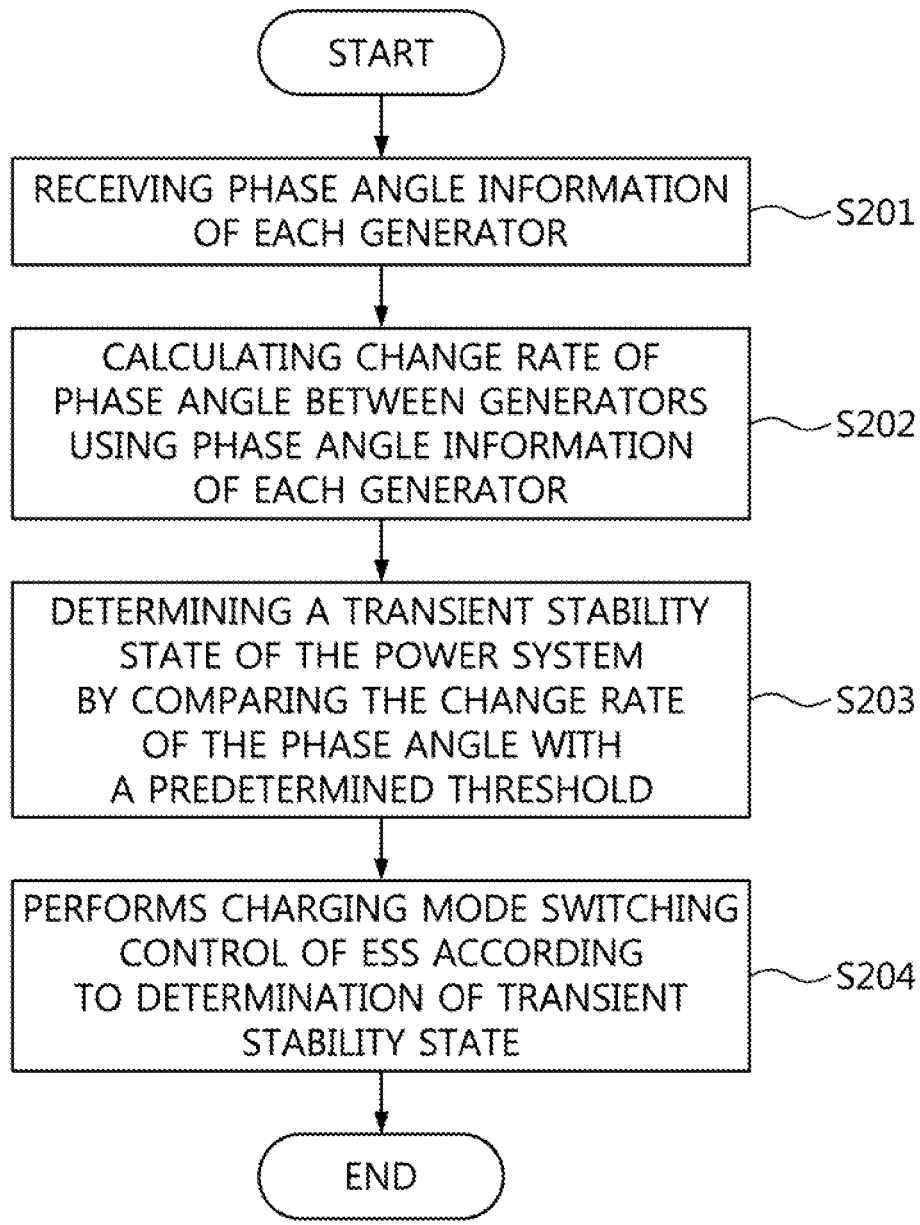
FIG. 2 is a view illustrating an ESS control method based on the transient stability state according to an embodiment of the present invention.

FIG. 2 is a view illustrating an ESS control method based on the transient stability state according to an embodiment of the present invention.

First, the ESS control device 100 receives phase angle information of each generator from the PMUs 1 to n of each generator (S201).

Then, the ESS control device 100 calculates a change rate of phase angle between generators using phase angle information of each generator (S202). Herein, the ESS control device 100 checks a phase of the generator having the fastest phase and a phase of the generator having the slowest phase at each of times t and t', thereby calculating the change rat of phase angles.

Then, the ESS control device 100 determines the state of the transient stability by comparing the change rate of phase angle between the generators with the predetermined threshold value (S203). Herein, the ESS control device 100 determines as the transient instability state, when the change rate of phase angle between generators is greater than or equal to a predetermined threshold value, and determines as the transient stable state, when the change rate of phase angle between generators is less than the predetermined threshold value. Here, the ESS control device 100 proceeds to the next step in the case of the transient instability state and terminates control in the case of the transient stable state.

After that, the ESS control device 100 performs charging mode switching control of the ESS according to the determination of the transient stability state (S204). Herein, the ESS control device 100 calculates the output value of each ESS in the charging mode to control the output of the corresponding ESS.

The ESS control device 100 is responsive to the output value in the charging mode within one second at the time of transient, and then the output may be changed to zero or used for frequency adjustment control.

Meanwhile, when the ESS control device 100 performs charging mode switching control of the ESS, the above-described steps (steps S201 to S204) are not performed until the transient stability is improved. The above-described steps are repeatedly performed after the power system is stabilized again.

Figure 3:
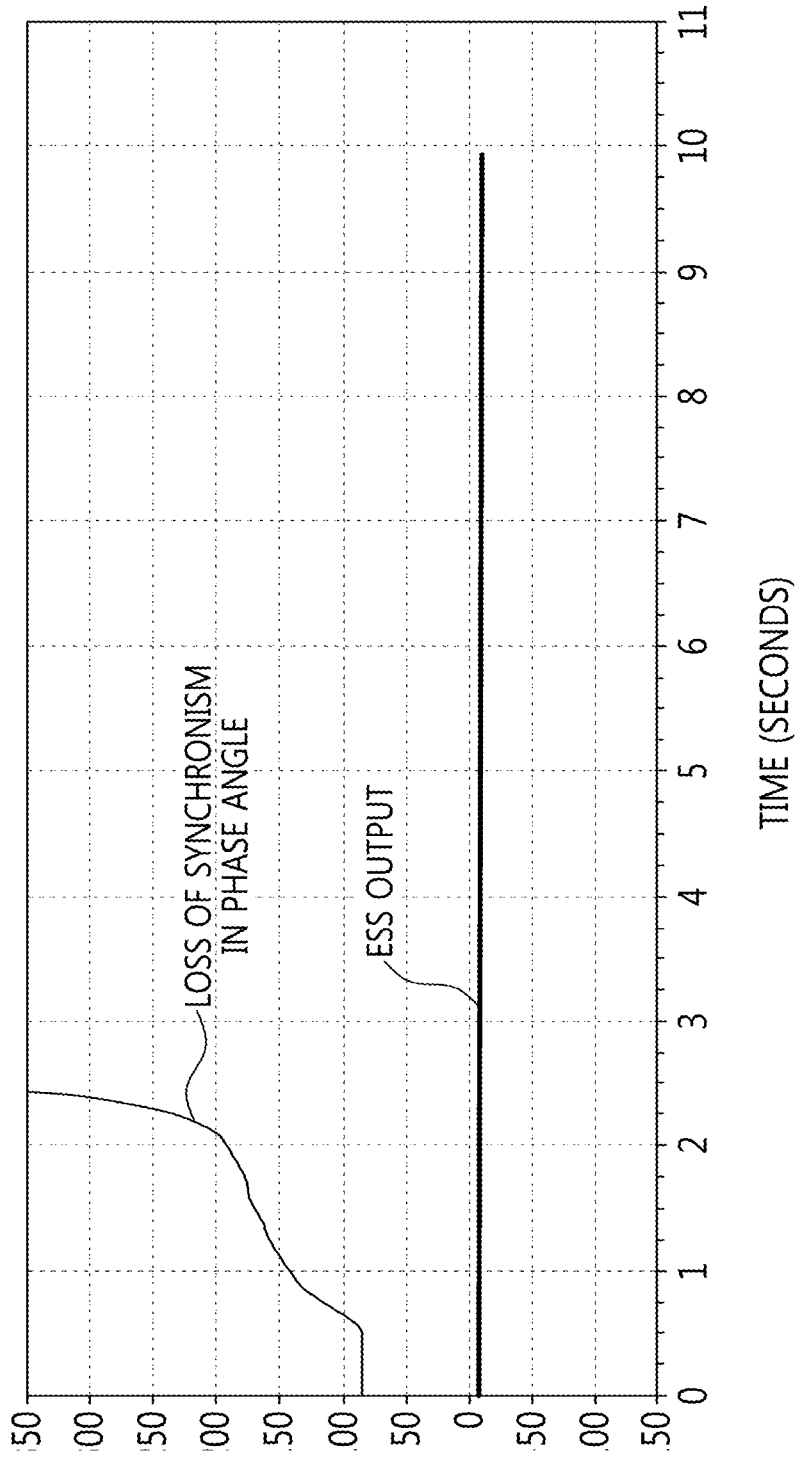
FIGS. 3 and 4 are views illustrating the improvement of the transient stability through charging mode switching control of the constant output in an ESS in the case of power system disturbance.
Figure 4:
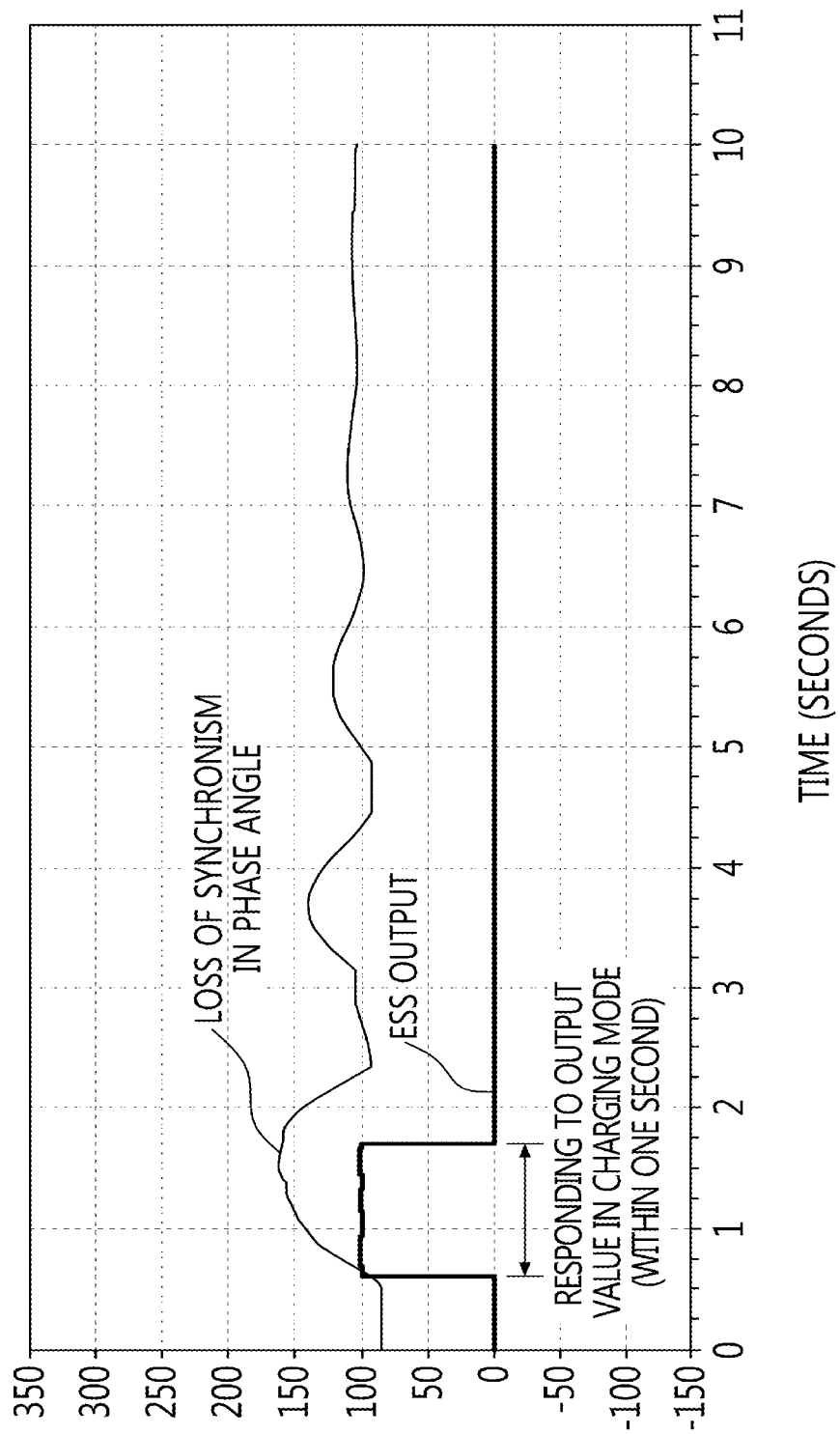

FIGS. 3 and 4 are views illustrating the improvement of the transient stability through charging mode switching control of the constant output in an ESS in the case of power system disturbance.

FIG. 3 is a graph showing that a loss of synchronism is caused due to the transient instability to diverge a waveform, when the output of the ESS at the power generation stage is '0' in the case of the power system disturbance, and FIG. 4 is a graph showing that the ESS at the power generation stage is controlled to be switched to the charging mode in the case of the power system disturbance, and thus is responsive to the output value P in the charging mode for one second in the case of transient to prevent a loss of synchronism.

The method according to some embodiments may be embodied in the form of program instructions that may be executed by various computer means and recorded on a computer readable medium. The computer readable medium may include program instructions, data files, data structures, etc. alone or in combination. Program instructions recorded on the media may be those specially designed and constructed for the purposes of the present invention, or they may be of the kind well-known and available to those having skill in the computer software arts. Examples of computer-readable recording media include magnetic media such as hard disks, floppy disks, and magnetic tape, optical media such as CDROMs, DVDs, and magnetic-optical such as floppy disks, and hardware devices specifically configured to store and execute program instructions, such as ROM, RAM, flash memory, and the like. Examples of program instructions include not only machine code generated by a compiler, but also high-level language code that can be executed by a computer using an interpreter or the like.

The embodiments of the present invention described above are merely exemplary, and those skilled in the art will appreciate that various modifications and equivalent other embodiments are possible therefrom. Therefore, it will be understood that the present invention is not limited only to the form mentioned in the above detailed description. Therefore, the true technical protection scope of the present invention will be defined by the technical spirit of the appended claims. It is also to be understood that the present invention includes all modifications, equivalents and substitutions within the spirit and scope of the invention as defined by the appended claims.

The invention claimed is:

1. An apparatus for controlling ESS according to transient stability, the apparatus comprising:

a power system, which is composed of a plurality of generators having respective Phasor Measurement Unit (PMU);

an input unit receiving phase angle information from the power system;

a calculation unit calculating a change rate of the phase angle of the power system using the phase angle information;

a determination unit determining the transient stability state of the power system by comparing the change rate of the phase angle with a predetermined threshold; and a control unit performing control so that an energy storage system (ESS) installed in a power generation stage is switched to a charging mode according to the determination result, wherein the energy storage system (ESS) reduces the rotational speed of rotators of the generators to improve the transient stability in the charging mode.

2. The apparatus of claim 1, wherein the input unit receives frequency information instead of the phase angle information.

3. The apparatus of claim 1, wherein the change rate of the phase angle is a change degree of a speed difference in phases of the power system over time.

4. The apparatus of claim 1, wherein the determination unit determines the transient stability state as transient instability when the change rate of the phase angle is greater than or equal to the predetermined threshold.

5. The apparatus of claim 1, wherein the control unit calculates an output value in the charging mode for switching control of the ESS into the charging mode and determines the output value of each ESS in the charging mode, to control an output of the ESS with the output value of each ESS in the charging mode.

6. The apparatus of claim 5, wherein the controller is responsive to the output value in the charging mode within a predetermined time at the time of transient.

7. A method for controlling ESS according to transient stability, the method comprising:

receiving phase angle information from a power system, which is composed of a plurality of generators having respective Phasor Measurement Unit (PMU);

calculating a change rate of the phase angle of the power system using the phase angle information;

determining a transient stability state of the power system by comparing the change rate of the phase angle with a predetermined threshold; and performing control so that an energy storage system (ESS) installed in a power generation stage is switched to a charging mode according to the determination result, wherein the ESS reduces the rotational speed of rotators of the generators to improve the transient stability in the charging mode.

8. The method of claim 7, wherein the determining is provided so that when the change rat of the phase angle is equal to or more than the predetermined threshold, the transient stability is determined as a transient instability state.

9. The method of claim 7, wherein the determining is provided so that when the phase angle change rate is less than the predetermined threshold, the transient stability is determined as a transient stable state and thus the control is terminated.

10. The method of claim 7, wherein the controlling is provided to calculate an output value in the charging mode for switching control of the ESS into the charging mode and determine the output value of each ESS in the charging mode, to control an output of the ESS with the output value of each ESS in the charging mode.

11. The method of claim 7, wherein the change rate of the phase angle is change degree of a speed difference in phases of the generators over time.

* * * * *